United States Patent [19]

Mozzhukhin et al.

[11] 4,116,375
[45] Sep. 26, 1978

[54] APPARATUS FOR HARD FACING OF VALVES FOR INTERNAL COMBUSTION ENGINES

[76] Inventors: Anatoly Alexandrovich Mozzhukhin, ulitsa Pochaininskaya, 23, kv. 43; Vladimir Petrovich Sotchenko, ulitsa P.Tychiny, 13, kv. 210, both of Kiev, U.S.S.R.

[21] Appl. No.: 790,980

[22] Filed: Apr. 26, 1977

[51] Int. Cl.$^2$ .......................... B23K 1/04; B23K 37/04
[52] U.S. Cl. ........................................ 228/48; 228/49; 228/212
[58] Field of Search ................................ 228/47–49, 228/212; 51/215 R, 215 HM

[56] References Cited
U.S. PATENT DOCUMENTS

| | | | |
|---|---|---|---|
| 3,501,870 | 3/1970 | Bottomley | 51/215 R |
| 3,942,703 | 3/1976 | Plegat | 228/47 X |

Primary Examiner—Donald G. Kelly
Attorney, Agent, or Firm—Fleit & Jacobson

[57] ABSTRACT

An apparatus is designed for hard-facing internal combustion engines valves by the melting and fusion in high-frequency current field of heat-resistant rings of hard alloy upon the seating surface of the valves. The apparatus comprises an actuator means mounting gripping jaws and a support which is adapted to receive the ring and to feed it onto the valve stem at the moment the valve being gripped by the jaws. The actuator associates with a manipulator adapted to provide for turning movement thereof in two mutually perpendicular planes, thereby conveying the valve with the ring positioned on its seating surface from the receiving area fusion or welding zone, the valve stem being upwardly directed at the same time. The apparatus features high efficiency owing to combining the steps of putting the alloy ring on the valve and conveying the latter to the welding or fusion zone.

8 Claims, 6 Drawing Figures

APPARATUS FOR HARD FACING OF VALVES FOR INTERNAL COMBUSTION ENGINES

BACKGROUND OF THE INVENTION

The present invention relates to apparatus for hard facing of machine parts, and more particularly to apparatus for hard facing of the seating surfaces of internal combustion engine valves with heat-resistant alloys.

The term "seating surface" is used to denote a chamfer made in the valve head of an internal combustion engine and used to ensure a close fit with the respective seat chamfer.

The seating surfaces of valves for internal combustion engines are subjected to repeated contact loads and to the effect of high temperatures reaching 800°–1000° C. Heat-resistant alloys are welded on the seating surfaces of valves to increase the service life thereof.

At present, the seating surfaces of the valves for internal combustion engines are hard-faced with the aid of apparatus comprising flame hardening, plasma-arc and HFC working elements, respectively, which are used for melting the heat-resistant alloy being faced. The adaptability for automatic operation as well as the simplicity of the process of hard facing of the valve seating surface in the HFC field are advantageous features of the apparatus with the HFC working element, as compared to other known apparatus.

Known in the art are apparatus for hard facing of the seating surfaces of valves, such as disclosed in British Pat. No. 743,582, in which the valve is assembled, i.e. the alloy ring is fitted on the valve head, and after being assembled, is placed into the fusion zone by an operator. However, much time and labour spent on these auxiliary operations predetermine low efficiency of such apparatus.

There is also known in the art an apparatus for hard facing of valves for internal combustion engines, as disclosed in the description of the invention of the USSR Inventor's Certificate No. 292,400, in which the valve is assembled and conveyed to the fusion zone (to the heater) automatically. This apparatus comprises a support movable along the vertically positioned valve stem and adapted to receive an alloy ring and feed it onto the valve stem, hinged gripping jaws provided with a mechanism for bringing them apart and adapted to clamp the valve stem end with said alloy ring thereon, said jaws being connected with the horizontal shaft of a manipulator which is adapted to turn said jaws in two mutually perpendicular planes, the valve stem being upwardly directed at the same time, thus providing for conveying said valve to the fusion zone in which there is a heater in the form of a high frequency ring-shaped electrical inductor.

This support is made as a drum freely fitted on a vertical shaft, said drum containing on its lower end face a roller interacting with a positive slide block. Another drum rigidly fitted on the same shaft is adapted to receive the valves with their stems directed downwards said valves being fed by way of a feed chute. These two drums are coaxially mounted on a vertical shaft and make up a mechanism for assembling the valves with the heat-resistant alloy ring thereon.

Though the above-described apparatus provides for automatic assembling of the valve with the alloy ring thereon and conveying said valve to the welding or fusion zone, the apparatus still suffers from a number of disadvantages.

Thus, to gear the shafts in the known apparatus use is made of Geneva mechanisms and a system of cams which substantially complicates the design of the apparatus as a whole. Besides, the described above mechanism for assembling the valve with the alloy ring thereon necessitates separate operations of putting the ring on the valve stem and subsequent conveying it to the manipulator which finally puts the alloy ring on the valve head. This in its turn complicates the design of the mechanism and reduces the efficiency of the process.

It should also be taken into account that excessive number of components significantly raises the manufacturing cost of the apparatus, as well as impairs its operating reliability.

It is, therefore, an object of the invention to provide an apparatus for hard facing of the seating surfaces of internal combustion engine valves, which is simple in construction and easy in operation.

Another object of the invention is to provide an apparatus for hard facing of the seating surfaces of internal combustion engine valves, which exhibits high operating efficiency.

Still another object of the invention is to provide an apparatus for hard facing of the seating surfaces of internal combustion engine valves, which is reliable in operation.

Yet another object of the invention is to provide an apparatus for hard facing of the seating surfaces of internal combustion engine valves, which is fairly cheap to manufacture.

These and other objects of the invention will become apparent from the detailed description of the invention.

SUMMARY OF THE INVENTION

In accordance with the above and other objects the invention consists in that in an apparatus for hard facing of the valves for internal combustion engines by the melting and fusion of heat-resistant rings of hard alloy upon the seating surfaces, comprising a support for receiving the alloy ring and feeding it onto the valve stem, hinged gripping jaws connected with the mechanism for bringing apart thereof and adapted to grip the valve, a manipulator providing for turning movement of the gripping jaws in two mutually perpendicular planes for positioning the valve with its stem being upwardly directed and conveying the valve to the welding or fusion zone, and a heater. In accordance with the invention the manipulator comprises an actuator carrying gripping jaws, a mechanism for bringing apart said jaws and a support articulated for movement in the gripping jaws operating plane, effected by means of the conveying mechanism kinematically linking the support with the mechanism for bringing apart the gripping jaws so as to provide shifting of said support towards the gripping jaws or backwards therefrom as they are brought together or apart, respectively.

It is advantageous that the mechanism for bringing apart the gripping jaws be made as a device comprising a rod mounted within the actuator body, one end of said rod being protruded beyond the body, a slide block attached to the rod and carrying a yoke which has opposite helical grooves for accommodating carriers of said gripping jaws therein, and a compression spring fitted on the rod and thrust with one end against said slide block and with the other against said actuator body.

The mechanism for bringing apart the gripping jaws can be provided with controls made up of positive and adjustable stops positioned respectively above and below the actuator and adapted to control said mechanism both in the ring and valve receiving area and in the fusion zone.

It is useful to have an adjusting screw on the positive stop for adjusting the length of travelling path of the rod during the interaction of its end with the positive stop in the alloy ring and valve receiving area, and to have the adjustable stop in the form of a roller associated with the rod of an air cylinder positioned in the fusion zone.

The conveying mechanism may comprise a toothed rack attached to the slide block, a toothed sector made on the support and an idle gear engaged with the rack and the toothed sector.

In this way the arrangement on a common actuator associated with the manipulator of gripping jaws and a support receiving the alloy ring, as well as the interconnection between said support and the mechanism for bringing apart the gripping jaws have enabled the apparatus design to be considerably simplified and its efficiency increased owing to combining the steps of putting the alloy ring both on the stem and finally on the head of the valve and conveying the latter from the receiving area to the welding or fusion zone.

This and other objects and advantages of the invention will become apparant from a detailed description of the embodiment thereof in conjunction with the accompanying drawings, wherein:

DESCRIPTION OF THE PREFERRED EMBODIMENT OF THE INVENTION

Figure 1:
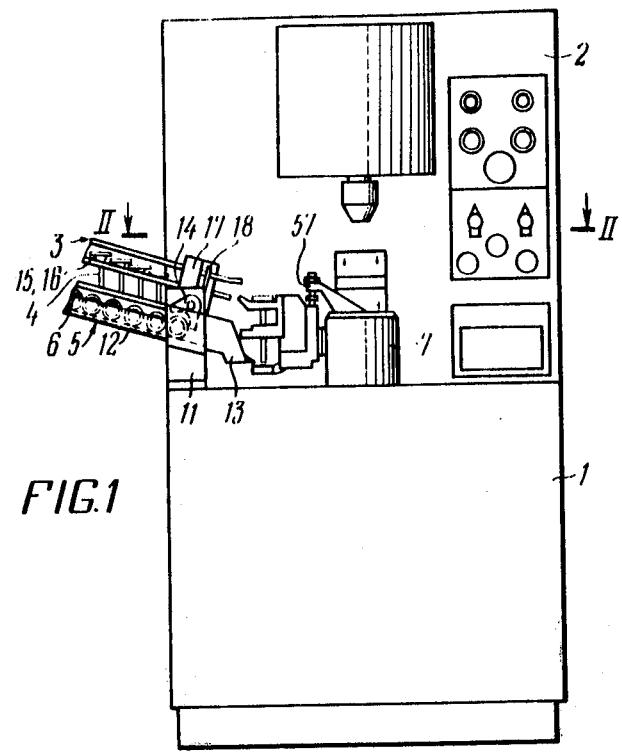
FIG. 1 is a general view of an apparatus for hard facing of the seating surfaces of internal combustion engine valves constructed according to the invention.

An apparatus for hard facing of the seating surfaces of internal combustion engine valves (as shown in FIG. 1) comprises a bed plate consisting of block 1 and block 2.

Figure 2:
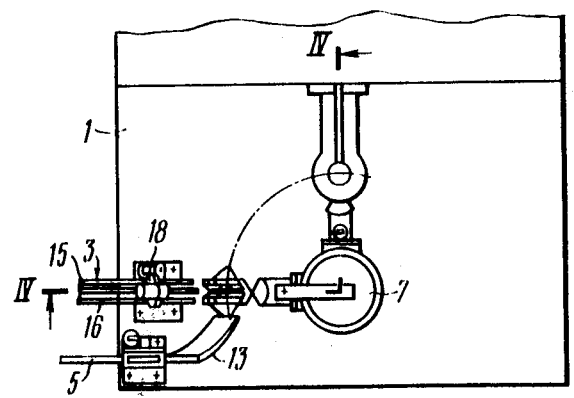
FIG. 2 is a view taken along the line II—II in FIG. 1, partially broken, and shows a base plate unit carrying mechanisms for feeding valves and alloy rings.

Mounted on block 1 is a mechanism 3 for feeding valves 4, a mechanism 5 for feeding alloy rings 6, and a manipulator 7 (FIGS. 1 and 2) adapted to receive said valves and alloy rings, to assemble them and to convey to the welding or fusion zone. On the block 1 there is mounted a plunger 8 (FIG. 3) adapted to raise the valve with the alloy ring thereon directly to the place where hard facing takes place.

Figure 3:
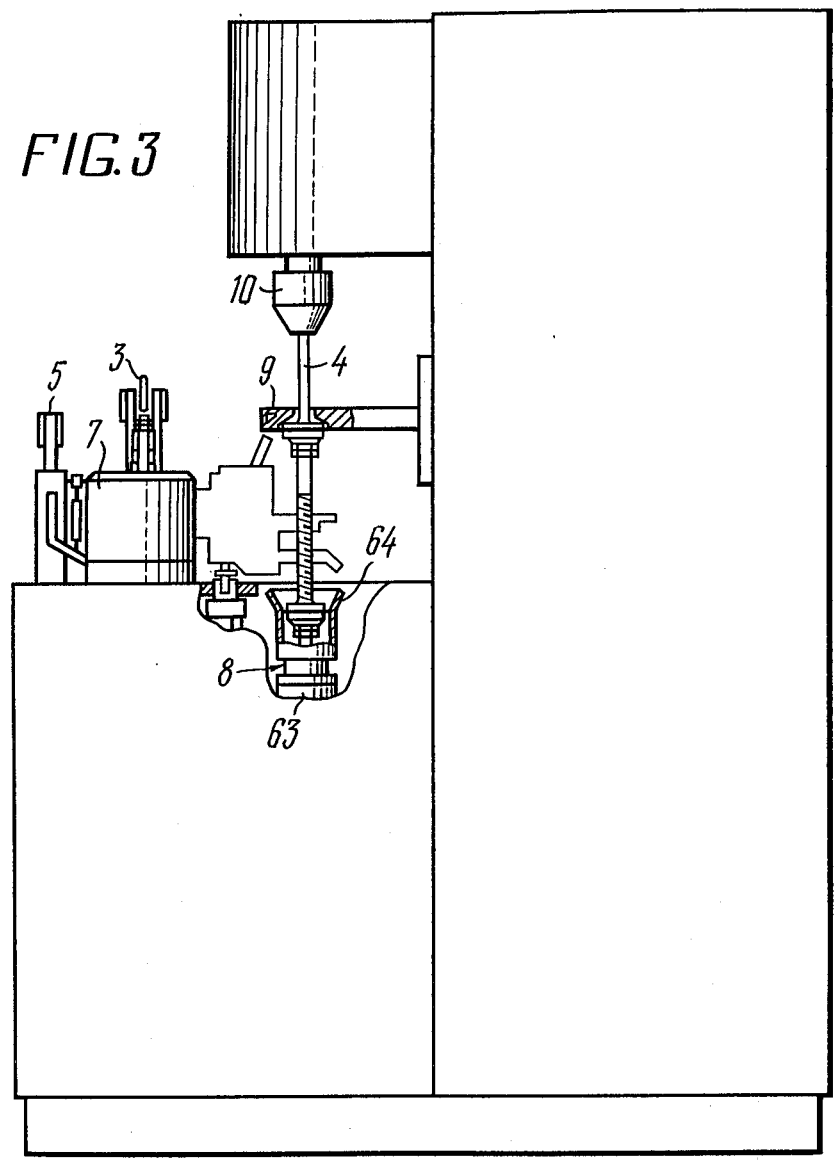
FIG. 3 is a side view of the apparatus of FIG. 1, partially broken, and shows the plunger.

The block 2, as can be seen from FIG. 3, accommodates a heating means mounted thereon in the form of a high frequency electrical inductive heater 9 which is fed, depending on the size of the valve, with current of appropriate frequency, say, within 2400 and 8000 Hz. Mounted on the same block 2 is a chuck 10 (FIG. 3) adapted to clamp the valve stem by the end and to rotate it about its axis, said chuck being provided with suitable drives (not shown).

The alloy ring feeding mechanism 5 is mounted on a bracket 11 (FIG. 1) and comprises an inclined feed chute 12 of rectangular section to enable the alloy rings to roll in a vertical position. Another inclined chute 13 (FIG. 2) is attached crosswise to the feed chute 12 to enable the alloy ring to slip on its lateral surface substantially in a horizontal position.

A device 14 (FIG. 1) mounted on the feed chute 12 and adapted to feed the alloy rings one by one is not within the scope of claims of the present invention, and to avoid the unnecessary burdening of the drawings and description, is given schematically, and if required, can be selected by those skilled in the art from suitable known devices, for example of the escapement type, comprising an arm mounted on an axle.

The valve loading mechanism 3 comprises guides in the form of parallel rods or plates 15 and 16 (FIGS. 1 and 2) on which rests by its head the valve to be fed with its stem directed downwards. A device 18 for feeding the valves piece by piece is mounted on a bracket 17, said device being shown schematically for the same reason as the ring feeding device.

Figure 4:
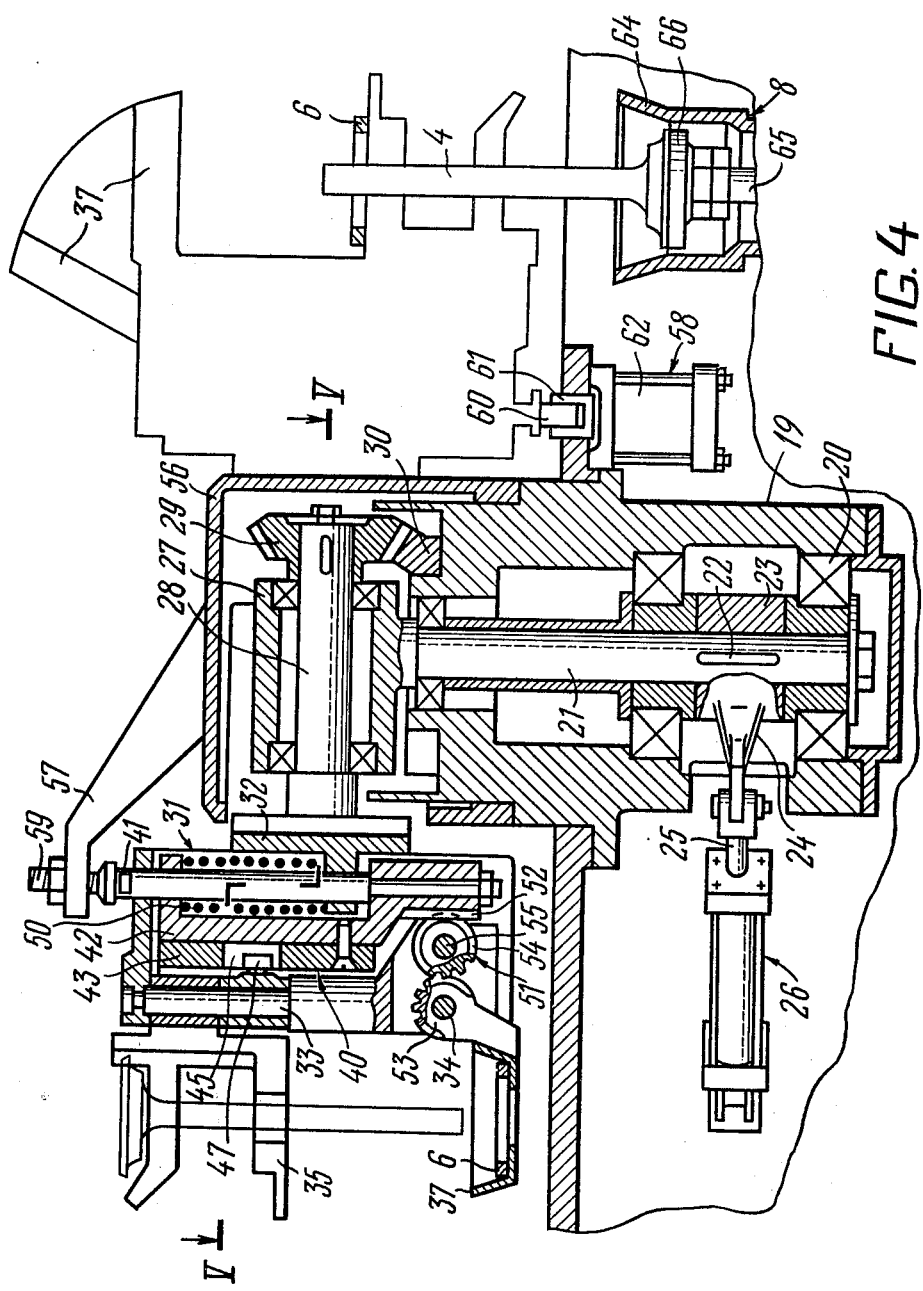
FIG. 4 is a longitudinal sectional view, taken along the line IV—IV in FIG. 2, and shows the manipulator carrying the actuator.

According to the invention the manipulator 7 (as shown in FIG. 4) comprises a cylindrical body 19 wherein is mounted in bearings 20 a vertically disposed shaft 21 with a bushing 23 fitted there on a key 22 and with an arm 24 fixed to the bushing. The arm 24 is hinged to a rod 25 of a drive means made in the form of an air cylinder 26 adapted to turn said shaft through 90°.

Figure 5:
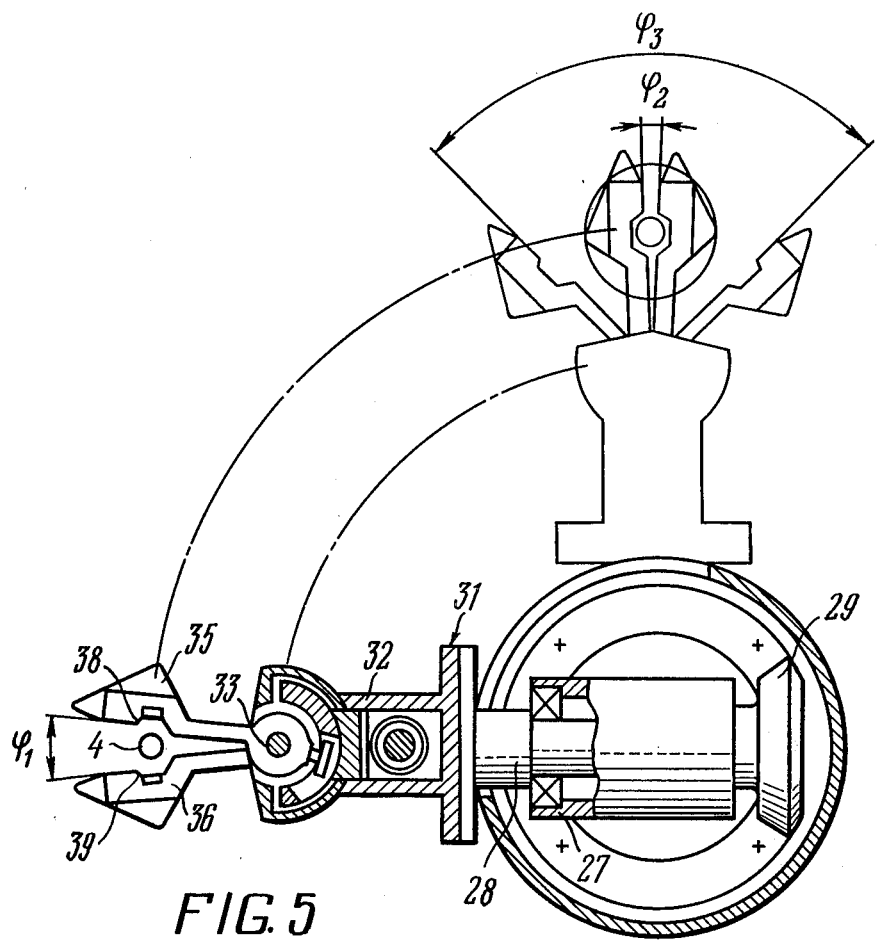
FIG. 5 is a view taken along the line V—V in FIG. 4, and shows the position of the gripping jaws in the valve receiving area and in the welding or fusion zone.
Figure 6:
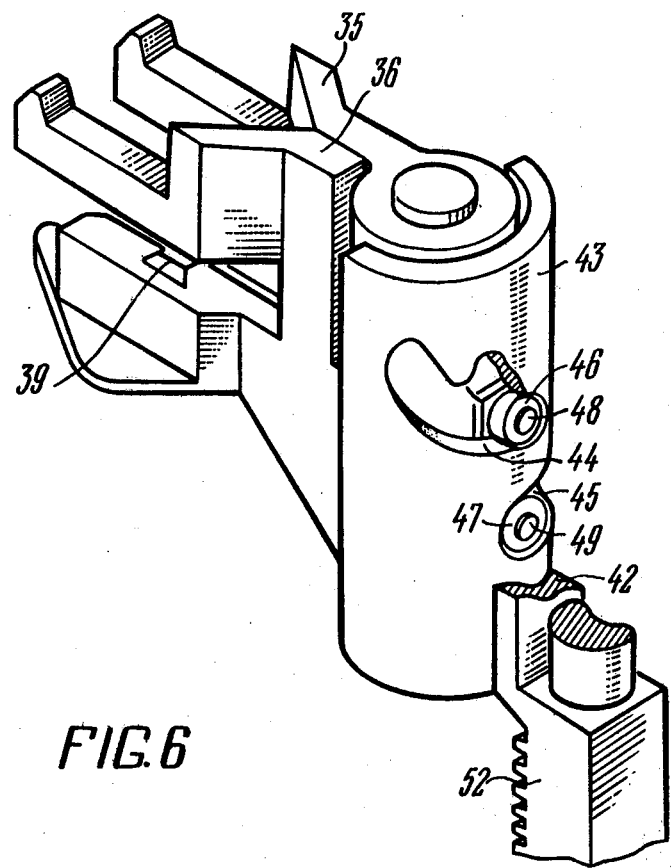
FIG. 6 is an enlarged perspective view of a mechanism for bringing apart the gripping jaws.

Mounted on the upper end of the vertically disposed shaft 21 is a bearing support 27 carrying a horizontal shaft 28. The horizontal shaft 28 of the manipulator 7 has a bevel pinion 29 attached to one end of the shaft and engaged with an immovable toothed sector 30. Attached to the other end of said shaft is an actuator 31 which has on its body 32, in accordance with the invention, hinged gripping jaws 35 and 36 mounted on axles 33 and 34 respectively and adapted to grip the valves, and a vertically rotatable cup-like support 37 adapted to receive the alloy ring and to put it on the valve stem. As is shown in FIGS. 5 and 6, on the internal surface of each gripping jaw 35 and 36 there are grooves 38 and 39 respectively. These grooves 38 and 39 are arranged opposite to one another and form a space during the closure of the jaws 35 and 36 to accommodate the valve stem therein.

Body 32 (FIG. 4) of the actuator 31 accommodates a mechanism 40 for bringing apart the gripping jaws 35 and 36, said mechanism containing a rod 41 installed in the guide openings of the body 32 in such a way that one of its ends having a spherical end face protrudes beyond the body 32. A slide block 42 is rigidly put on the rod 41. Fixed to the slide block 42 is a semi-cylindrical yoke 43 (FIG. 6) having opposite helical grooves 44 and 45 adapted to accommodate therein rollers 46 and 47 mounted respectively on carriers 48 and 49 of the gripping jaws 35 and 36. A compression spring 50 (FIG. 4) is put on the rod 41 and thrusts with one end against the slide block 42 and with the other against the body 32.

The support 37 by way of conveying mechanism 51 is kinematically linked with the mechanism 40 for bringing apart the gripping jaws 35 and 36. The conveying mechanism 51 comprises a toothed rack 52 attached to the slide block 42 substantially in parallel with the axis of the rod 41, a toothed sector 53 made on the support 37 and constituting in fact a tail piece thereof, and an idle gear 54 mounted on an axle 55 in mesh with the toothed rack 52 and the toothed sector 53.

A positive stop 57 mounted on a cover 56 of the body 19 of the manipulator 7 and an adjustable stop 58 installed on the block 1 make up a means which controls the mechanism for bringing apart the gripping jaws 35 and 36.

The positive stop 57 is in fact a bracket positioned above the actuator 31 substantially in the alloy ring and valve receiving area and has an adjusting screw 59 on the bracket horizontal shelf, the screw being adapted to adjust, by acting on the rod 41, the angle of opening of the gripping jaws 35 and 36 in the initial position of the actuator or in the valve receiving area.

The adjustable stop 58 is arranged below the actuator 31 substantially in the fusion zone. It comprises a roller 60 mounted on a rod 61 of an air cylinder 62.

The plunger 8 (FIGS. 2 and 4) consists of an air cylinder 63 with a conical cup 64 mounted thereon and a platform 66 mounted on the rod 65.

For a better understanding of the apparatus for hard facing of the seating surfaces of internal combustion engine valves, in accordance with the invention, hereinafter it is described in automatic operation. The means providing for automatic operation, being not within the scope of the present invention, is not represented in the drawings and is not characterized in detail so as not to burden the description and not to impede the revelation of the essence of the invention.

In the given example of the apparatus operation said means is referred to as the control system.

The apparatus for hard facing of the seating surfaces of internal combustion engine valves operates in the following manner:

In the initial position (as shown in FIGS. 1 and 4) of an actuator 31, a rod 41, after the interaction with a positive stop 57, is in a position in which gripping jaws 35 and 36 are opened at an angle of $\phi_1$ (FIG. 5) sufficient for a valve stem to pass between the gripping jaws 35 and 36, and a support 37 is substantially in a horizontal position relative to the plane of bringing together and apart the gripping jaws 35 and 36.

After being separated by the means 18 and 14 from a plurality of valves and alloy rings conveyed along guides 15 and 16 and the feed chute 12 respectively, one valve 4 and one alloy ring 6 are applied to the actuator 31, so that the valve with its stem directed downwards is loaded into the open jaws 35 and 36 and the alloy ring 6, sliding with its lateral surface on an inclined chute 13 nearly in a horizontal position, is fed onto the support 37.

Then an air cylinder 26 is switched on and its rod 25, entraining an arm 24, turns a vertical shaft 21. A horizontal shaft 28 carrying the actuator 31 turns about the vertical axis and simultaneously turns about its own axis due to rolling of a bevel pinion 29 on a toothed sector 30. Thus, the actuator 31 performs a rotary motion both in the horizontal and vertical planes. At the beginning of the motion of the actuator 31 the rod 41 disengages the positive stop 57 and, being pressed upon by the spring 50, goes up, entraining a slide block 42. During the slide block movement upwards a toothed rack 52 by way of an idle gear 54 imparts a rotary motion to a toothed sector 53 of the support 37 due to which the latter, turning in a vertical plane, towards gripping jaws 35 and 36 loads the alloy ring 6 onto the stem of the valve 4.

Simultaneously a yoke 43 connected with the slide block 42 moving upwards and acting by the lower surfaces of helical grooves 44 and 45 on rollers 46 and 47 brings together guides 48 and 49 which in their turn bring together the gripping jaws 35 and 36 until the latter clamp the stem of the valve 4 which is at the time in the space formed by grooves 38 and 39.

Thus, at the beginning of the travel of the actuator 31, simultaneously with the loading by the support 37 of the alloy ring 6 onto the stem of the valve 4, the stem is clamped by the gripping jaws 35 and 36.

Moving from the initial position or from the valve and alloy ring receiving zone to the fusion zone, the actuator 31 performs a rotary motion about a vertical axis through 90° and about a horizontal axis through 180°. Due to the cup-shaped configuration the support 37 prevents the fall of the alloy ring 6 from the stem of the valve 4 with its head directed downwards.

Upon reaching the fusion zone the actuator 31 turned through an angle of 180°, i.e. with the rod 41 and gripping jaws 35 and 36 directed downwards, and with the support 37 directed upwards, by the end of the rod 41 runs onto a roller 60 of an adjustable stop 58. Interacting with the roller 60, the rod 41, overcoming the pressure of a spring 50, is slightly forced by the actuator into a body 32. In such movement of the rod 41 and the yoke 43 connected thereto through the slide block 42 the surfaces of the grooves 44 and 45 act on the rollers 46 and 47 of the carriers 48 and 49, opening the gripping jaws 35 and 36 at an angle $\phi_2$ (FIG. 5) which is sufficient for releasing the valve stem but not large enough to let fall the alloy ring 6 which is on the gripping jaws.

Released from the gripping jaws 35 and 36, the valve 4, not going out by the end of the stem from the space formed by the grooves 38 and 39, freely lowers down and lies with the surface of its head on a platform 66 of a plunger 8.

On command of the control system, an air cylinder 62 of the adjustable stop 58 comes into action and a rod 61 with the roller 60 attached thereto pushes the rod 41 upwards to a maximum length thereby opening the jaws 35 and 36 at an angle $\phi_3$ (FIG. 5) sufficient for the alloy ring 6 to pass through them under gravity. Besides, during such movement of the slide 42 induced by the rod 41 the slide block toothed rack 52 turns the support 37 upwards or towards the gripping jaws 35 and 36 through the idle gear 54 thereby freeing the space under the inductive heater 9 (FIG. 4).

The alloy ring 6 guided by the internal conical surface of the cup 64 is put on the head of the valve 4.

Thus, the valve with the ring put on its head is ready for hard facing.

A command from the control system switches on an air cylinder 63 of the plunger 8 whose rod 65 while going up shifts the valve 4 with the alloy ring 6 thereon from the platform 66 to the fusion zone. Upon reaching the aperture in a chuck 10 by the end of the stem of the valve 4 and respectively upon reaching the ring of a high frequency inductive heater 9 by the head of the valve 4, the end of the stem depresses the track-limit switch (not shown) located inside the aperture of the chuck 10. Then the following commands are supplied by the control system: for clamping and turning the chuck 10, for switching on the high frequency electrical inductive heater 9, for moving down the rod 61 with the platform 66 and then for the operation of the air cylinders 62 and 26 to withdraw the actuator 31 from the fusion zone.

The heat-resistant alloy ring 6 molten in the high frequency current field is welded on the head of the valve 4 which is being rotated for a uniform spread of the molten metal on its working surface.

As has been stated above, a command from the control system actuates the air cylinder 26 whose rod 25 returns to the initial position. When moving, the rod 25 entrains the arm 24, thus providing for rotary motion of a vertical shaft 21. During this motion the horizontal shaft 28 with the actuator 31 attached thereto turns about the vertical axis and due to the interaction of the bevel pinion 29 with the bevel toothed sector 30, performs a turn about the horizontal axis.

Similarly to the described above, at the beginning of the motion of the actuator 31, the rod 41 disengages the roller 60 of the adjustable stop 58, and pressed by the expanding spring 50, performs a progressive movement, entraining the slide block 42.

During the progressive motion of the slide block 42 the toothed rack, acting through the idle gear 54 on the toothed sector 53, turns the support 37 into the previous position and the yoke 43, acting by the surfaces of the helical grooves 44 and 45 on the rollers 46 and 47 of the carriers 48 and 49 brings the latter together, thus providing for bringing together of the gripping jaws 35 and 36 which are fitted on an axle.

After turning through 90° in the horizontal plane and through 180° in the vertical plane, the actuator 31 runs by the end of its rod 41 onto the positive stop 57 and comes to a halt while gripping jaws 35 and 36 and the support 37 return to the initial position. The actuator 31 is again ready to receive the next pair of parts which are loaded onto the valve head one by one by means of mechanisms 3 and 5 and is at a rest until the end of the previous cycle of valve thermal facing.

Upon completion of the period of hard facing of valve seating surface a command is given for opening the chuck 10 and for turning the actuator 31 which carries the next valve with the alloy ring into the fusion zone. The cycle repeats automatically in accordance with the control system commands.

While the invention has been described herein in terms of the preferred embodiment, numerous variations may be made in the apparatus as set forth in the appended claims.

What we claim is:

1. An apparatus for hard facing internal combustion engine valves by the melting and fusion of heat-resistant rings of hard alloy upon the seating surfaces thereof, comprising:
    an actuator having:
        a body;
        a pair of articulated gripping jaws extending from said body and adapted to receive and hold a valve having a stem;
        jaw moving means for moving said pair of articulated gripping jaws towards and away from each other, said jaw moving means being mounted within said body;
        a support for receiving an alloy ring, said support being hinged to said body; and
        conveying means kinematically linking said support with said jaw moving means;
    a manipulator carrying said actuator and adapted to turn the latter in horizontal and vertical planes for conveying the valve with the alloy ring thereon from a receiving area to a fusion or welding zone while the stem of the valve is upwardly directed;
    a heating means for fusing the alloy ring, said means being arranged in the fusion or welding zone at the end of the horizontal travelling path of said actuator;
    a means for controlling said jaw moving means both when said actuator is in the valve and alloy ring receiving area and in the fusion or welding zone.

2. An apparatus according to claim 1, wherein said jaw moving means comprises:
    a rod mounted in said body of said actuator so that one end of said rod protrudes beyond said body;
    a slide block fitted on said rod and rigidly attached thereto;
    a yoke attached to said slide block and having opposite helical grooves adapted to accommodate therein ends of said pair of articulated gripping jaws; and
    a compression spring fitted on said rod and thrust with one end against said slide block and with the other against the body of said actuator.

3. An apparatus according to claim 2, wherein said coveying means comprises:
    a toothed rack attached to said slide block substantially in parallel with the axis of said rod;
    a toothed sector formed on an end portion of said support and having an axle in said body of said actuator;
    an idle gear mounted on an axle in said body of said actuator in mesh with said toothed rack and said toothed sector.

4. An apparatus for hard facing internal combustion engine valves by the melting and fusion of heat-resistant rings of hard alloy upon the seating surfaces thereof comprising:
    an actuator comprising:
        a body;
        gripping jaws having first portions hinged to said body and second portions adapted to receive and hold a valve;
        a rod mounted in guide holes of said body so that one end protrudes beyond the body;
        a slide block fitted on said rod and rigidly attached thereto;
        jaw moving means operatively associated with said first portions of said gripping jaws for moving said second portions towards and away from each other including:
            a yoke attached to the slide block, said yoke having opposite helical grooves adapted to accommodate therein said first portions of said gripping jaws; and
            a compression spring fitted on said rod with one end thrusting against said slide block and the other end thrusting against said body;
        a toothed rack attached to said slide block substantially in parallel with the axis of said rod;
        a toothed sector made on said support and mounted on an axle within said body; and
        an idle gear mounted on an axis within said body in mesh with said toothed rack and said toothed sector;
    a manipulator carrying said actuator and adapted to turn the latter in horizontal and vertical planes, thus providing for conveying the valve with the alloy ring thereon from a receiving area to a welding or fusion zone while the stem of the valve is upwardly directed;

a heating means for fusing the alloy ring, said means being arranged in the fusion zone at the end of the horizontal travelling path of said actuator; and control means for controlling said jaw moving means when said actuator is both in the valve and alloy ring receiving area and in the fusion zone.

5. An apparatus according to claim 4, wherein said control means comprises:

a positive stop mounted above said actuator in the alloy ring and valve receiving areas to interact with said end of said rod of said jaw moving means; and an adjustable stop means movable between two positions, said movable stop means interacting with said end of said rod of said jaw moving means to move said gripping jaws from a closed to a first, partially open position and from the first position to a second, fully open position, said movable stop means being mounted below said actuator in the fusion zone.

6. An apparatus according to claim 5, wherein said adjustable stop means comprises:

an air cylinder;

a rod connected to said air cylinder; and a roller mounted on said rod.

7. An apparatus according to claim 4, wherein said manipulator comprises:

a cylindrical body arranged in a vertical position;

a toothed bevel gear sector mounted on a top end face of said cylindrical body;

a vertical drive shaft mounted in bearings within said cylindrical body;

a bearing support attached to a top end face of said vertical drive shaft;

a horizontal shaft mounted in said bearing support and carrying said actuator on one end;

a bevel pinion mounted on the other end of said horizontal shaft in mesh with said toothed bevel gear sector.

8. An apparatus according to claim 4, wherein said heating means is a high frequency ring-shaped electrical induction unit.

* * * * *